May 3, 1938.    G. A. LYON    2,115,779
VEHICLE LUGGAGE AND SPARE TIRE CLOSURE
Filed May 21, 1934    4 Sheets-Sheet 1
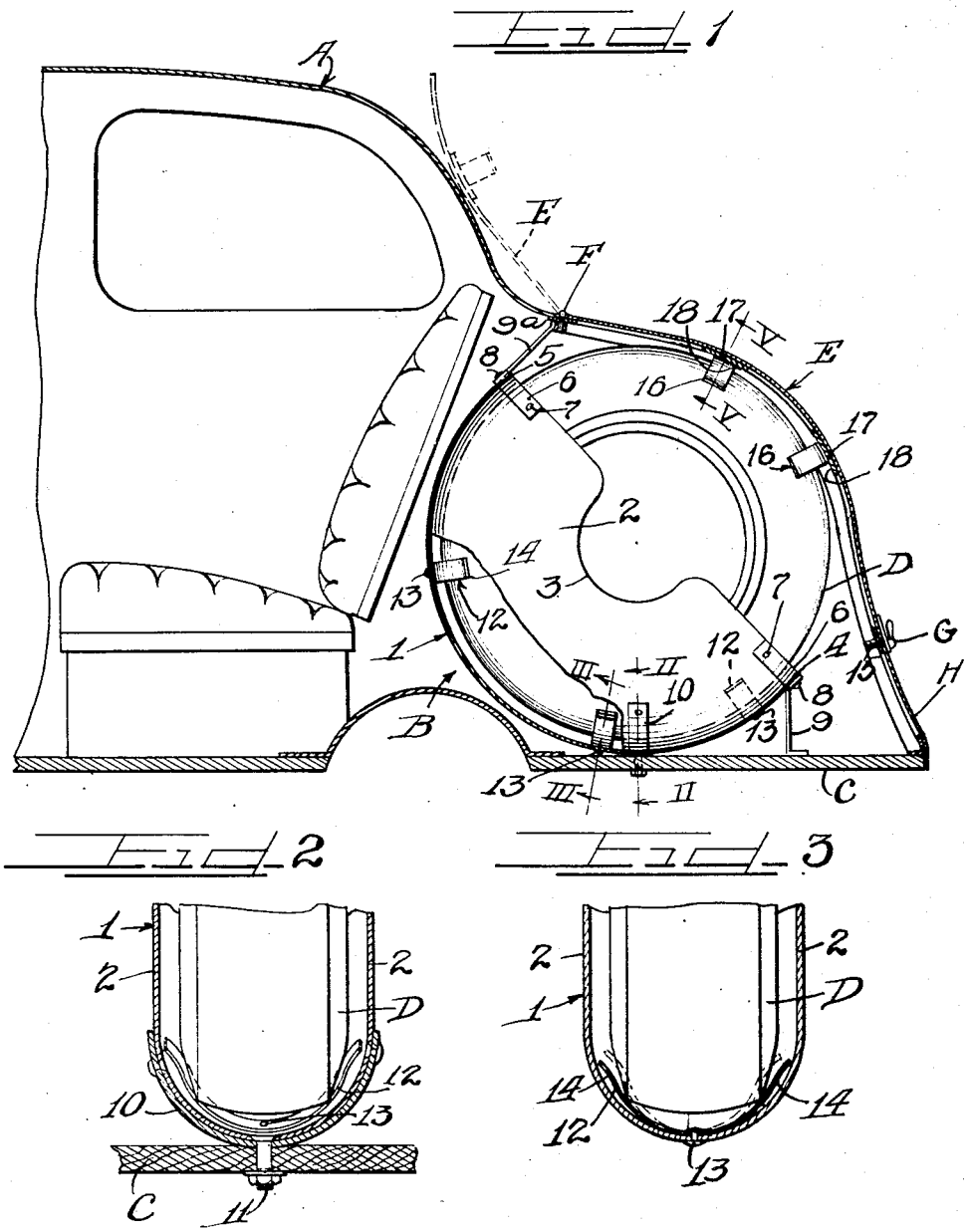
Inventor
George Albert Lyon May 3, 1938.　　　　G. A. LYON　　　　2,115,779
VEHICLE LUGGAGE AND SPARE TIRE CLOSURE
Filed May 21, 1934　　　4 Sheets-Sheet 2
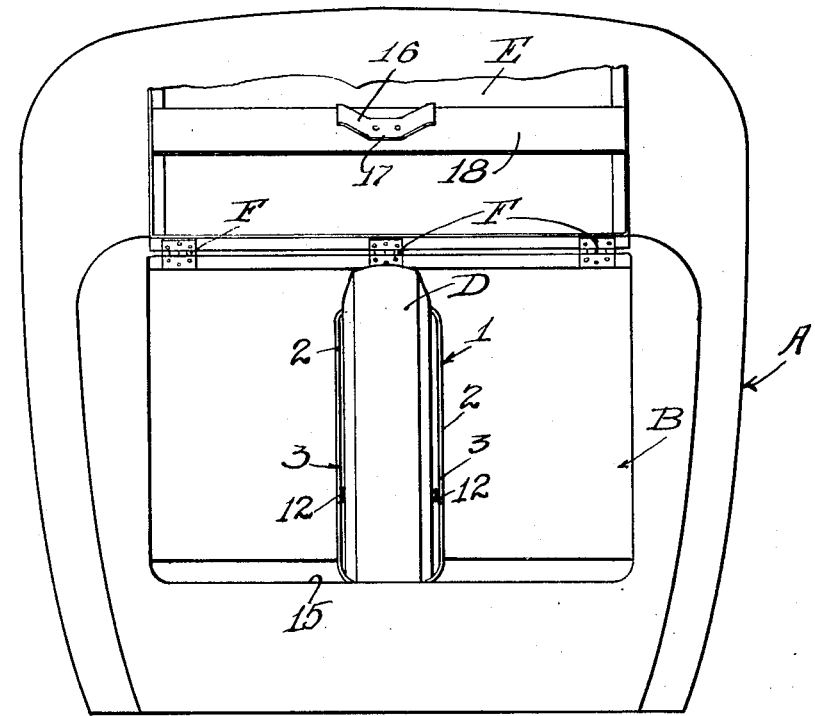
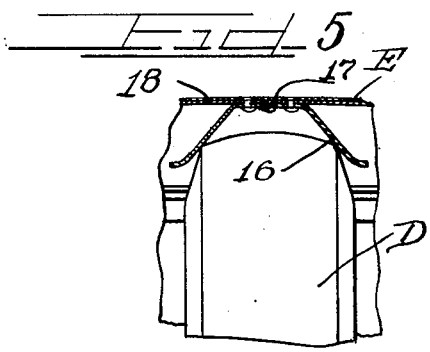
Inventor
George Albert Lyon

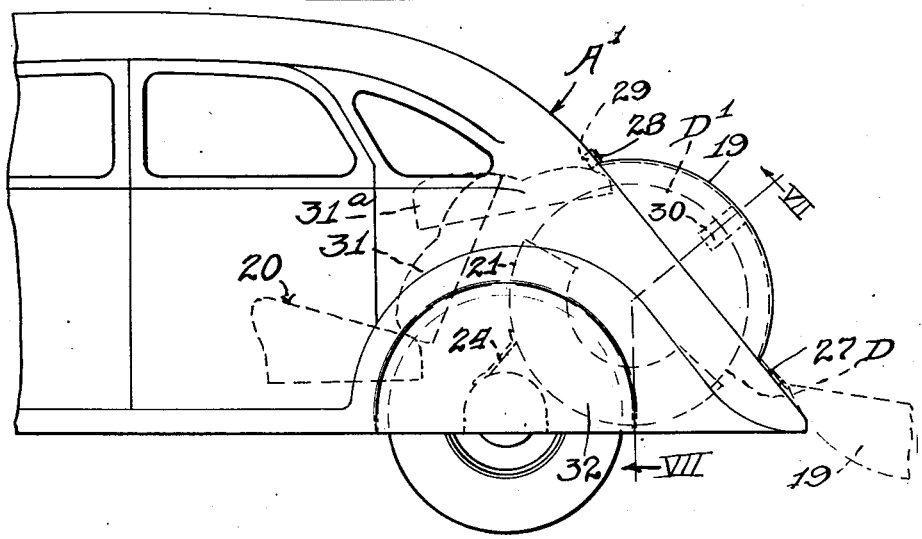
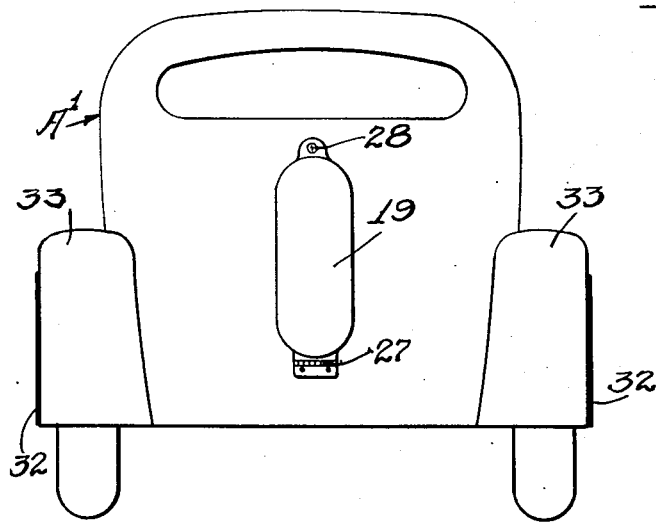
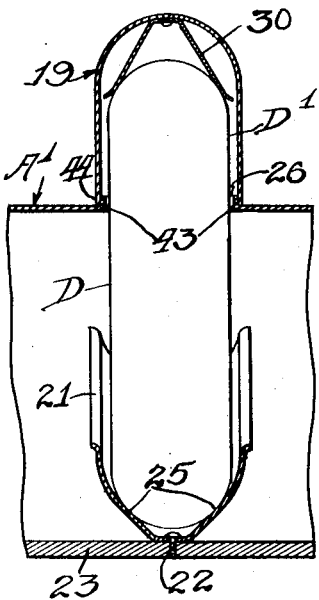

May 3, 1938.   G. A. LYON   2,115,779
VEHICLE LUGGAGE AND SPARE TIRE CLOSURE
Filed May 21, 1934   4 Sheets-Sheet 4
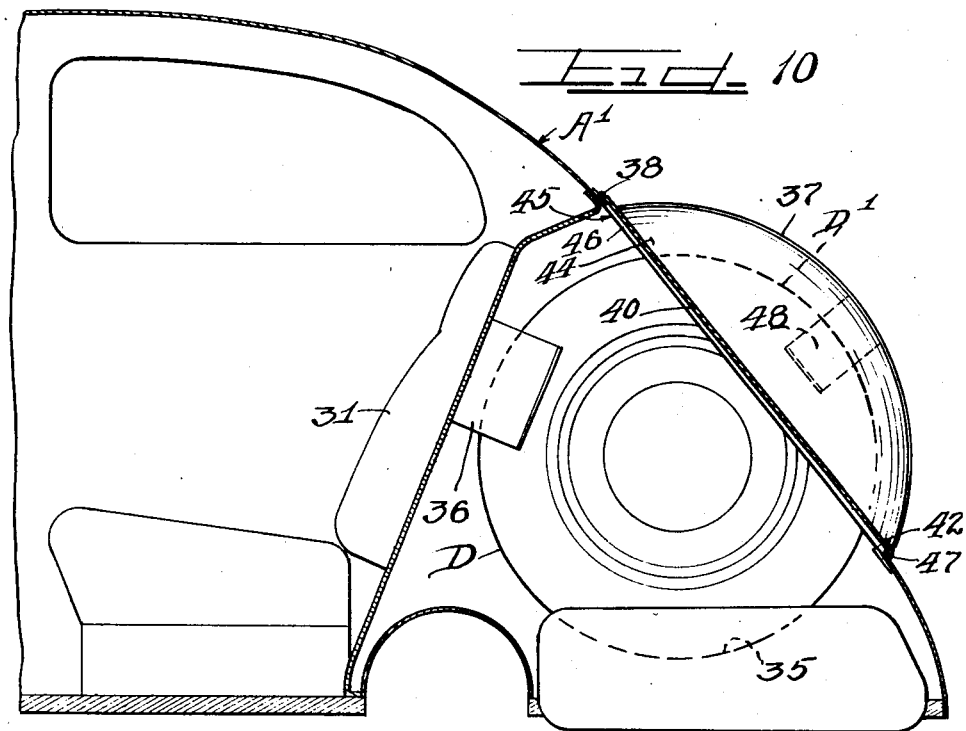
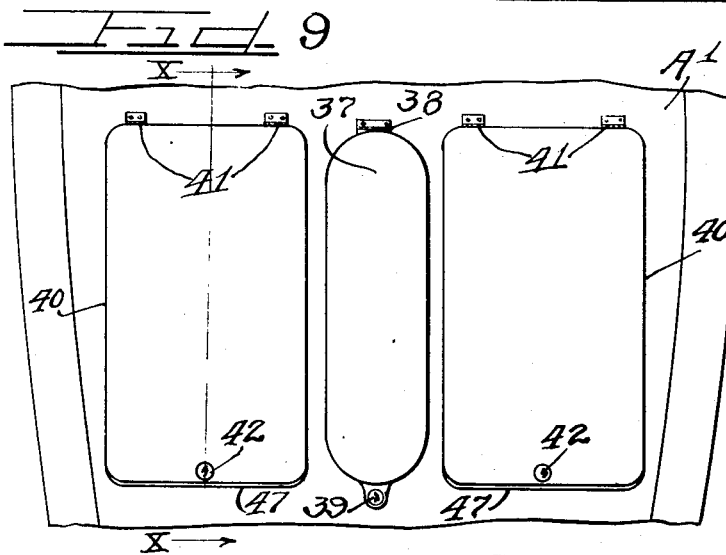
Inventor
George Albert Lyon
by Charles W. Hills ATTYS.

Patented May 3, 1938

2,115,779

UNITED STATES PATENT OFFICE 2,115,779

VEHICLE LUGGAGE AND SPARE TIRE CLOSURE

George Albert Lyon, Detroit, Mich., assignor to Lyon Incorporated, Detroit, Mich., a corporation of Delaware Application May 21, 1934, Serial No. 726,622

1 Claim. (Cl. 296—37)

This invention has to do with a closure for luggage carried by an automobile, wherein provision is made also for the supporting and covering of a spare tire.

It is an object of the invention to provide in a luggage compartment of an automobile a support for a spare tire.

It is another object of the invention to provide in a luggage compartment of an automobile a support for a spare tire, the support being so arranged that when the tire is supported therein, it requires no reconstruction or reshaping of the compartment door.

It is another object of the invention to provide means affording a resilient support for a spare tire in a vehicle luggage compartment.

It is another object to provide the door of a luggage compartment with means for resiliently holding a spare tire in substantially fixed position.

It is a further object of the invention to provide in a vehicle luggage compartment a holder for a spare tire, arranged to permit the deposit and support of luggage adjacent the holder.

Another object of the invention resides in the provision of a stabilizer forming part of the housing for a spare tire.

It is a further object of the invention to provide a hinged stabilizer forming part of the housing for a spare tire, whereby the latter may be removed when the rudder is swung open.

A further object of the invention is to provide for deposit and removal of luggage in the luggage compartment from within the car while providing for deposit and removal of the spare wheel and tire from the outside.

It is also an object of the invention to provide access from the outside individually to the luggage and spare tire compartments.

It is another object of the invention to employ a rudder of the car in the additional capacities of spare tire cover and as a guideway and support assisting in removal of the tire from the holder therefor.

In accordance with the general features of one form of the invention, a casing member simulating a peripheral part of a tire is substantially fixedly supported on the floor of the vehicle luggage compartment, and provided with one or more resilient cradles in its interior to receive and resiliently support a spare tire. The holder is of such form as to permit the tire to be readily deposited therein and removed. The holder is so arranged that when the tire is deposited therein, the tire is disposed well within the confines of the compartment so that no reshaping of the compartment or of the door thereof is required. The door of the compartment is provided interiorly with one or more resilient cradle elements arranged to firmly engage the upper part of the tire and cooperate with the holder in firmly positioning the tire and preventing rattling thereof, the door at the same time serving as a closure for the compartment as a whole.

The holder may be positioned in any suitable plane, such as a longitudinal plane of the vehicle. The holder is so arranged as to permit withdrawal of the tire by rolling the same, the forward lower extremity of the holder being preferably adjacent the lower sill of the door opening to temporarily support the tire as it is being deposited into and removed from the holder. The holder may be positioned in any part of the compartment, preferably at the middle so as to leave the spaces on opposite sides thereof for luggage, or at one end of the compartment to leave the remainder of the compartment for luggage.

In accordance with another form, the invention is employed on a streamlined automobile preferably at the rear thereof and is so constructed and arranged as to provide a substantially central stabilizing fin which affords part of the spare tire housing and providing substantially the only projection on the otherwise streamlined downwardly sloping rear panel of the automobile. Provision is made for hinging the fin so that it swings open upwardly, or it may swing open downwardly to provide a support and runway for the tire to assist in depositing and removing the same. Access to the luggage space may be provided from the interior or the exterior of the automobile.

Other objects and advantages of the invention will appear as the description proceeds.

This invention (in preferred forms) is illustrated in the drawings and hereinafter more fully described.

Figure 1 is a longitudinal sectional view of the rear part of an automobile, showing the invention applied to the luggage compartment at the rear of the vehicle, certain parts being shown for convenience in elevation.

Figure 2 is an enlarged fragmentary sectional view taken substantially in the plane designated by the line II—II in Figure 1, certain parts being shown for convenience in elevation.

Figure 3 is an enlarged fragmentary sectional view taken substantially in the plane designated by the line III—III in Figure 1, certain parts being shown in elevation for convenience.

Figure 4 is a fragmentary rear elevational view of the structure shown in Figure 1, with the door of the luggage compartment elevated.

Figure 5 is an enlarged fragmentary sectional view taken substantially in the plane designated by the line V—V in Figure 1, certain parts being shown in elevation for convenience.

Figure 6 is a fragmentary side elevation of another form of the invention.

Fig. 7 is an enlarged fragmentary sectional view taken substantially in the planes designated by the line VII—VII in Figure 6.

Figure 8 is an end elevation of Figure 6, taken as indicated by the arrow VIII.

Figure 9 is a fragmentary end elevation of another form of the invention.

Figure 10 is a fragmentary sectional view taken as indicated by the line X—X in Figure 9.

Referring now more particularly to the drawings, an automobile body A is shown in Figures 1 and 4 to be provided with a luggage compartment B on the floor of which is supported a spare tire holder 1. The holder 1 is substantially semi-circular and of such diameter as to readily receive and support tires of various sizes and conditions of wear. The holder 1 is preferably provided with side wall portions 2 which are cut away at 3 adjacent the center of curvature of the holder 1 so as to provide clearance for the hub structure of a wheel on which the spare tire may be supported.

The holder 1 is preferably arranged in a vertical plane extending longitudinally of the vehicle and so that its front end 4 is substantially below its rear end 5. The front end 4 has fastened to the outer surface thereof a cradle 6 as by riveting 7 and 8, the latter rivet means being preferably located intermediate the ends of the cradle 6 and securing the upper end of a bracket 9 extending upwardly from and secured to the floor C of the compartment B in any suitable manner.

The lowermost part of the holder 1 is similarly secured to a similar cradle 10 and through the stud 11 and associated nut, directly to the floor C. The upper end 5 of the holder 1 is also secured to a cradle 6 at 7 and 8, where it is fastened to a bracket 9a suitably secured at its upper end to the body A. The holder 1 is thus rigidly secured in position.

The holder 1 is provided interiorly thereof with transversely extending resilient cradle elements 12 preferably rigidly secured centrally to the outer peripheral part of the holder 1 at 13 as by riveting, welding, brazing or in any other suitable manner, in substantially spaced relation to each other, to provide a resilient support for the tire when the latter is disposed in the holder. The cradles 12 are so formed that their arms 14 are normally closer together than the side portions of the tire D to be engaged thereby, so that when the tire is fitted in the holder 1 and received by the cradles 12, the side arms of the latter are spread apart by the outer periphery of the tire and thus resiliently position the tire in the holder and substantially prevent side sway of the tire and vibration in its own plane.

The forward end 4 of the holder 1 is arranged adjacent the lower sill 15 of the compartment so as to cooperate with said sill in supporting the tire D in transit as the tire is being deposited in and removed from the compartment. In removing the tire, the same need merely be rolled upwardly and forwardly the slight amount necessary to balance the same on the lower end 4 of the holder 1 and then swung forwardly so as to rest temporarily on the forward end 4 of the closure 1 and the sill 15. This relieves the attendant of the discomfort of having to bodily raise the spare wheel and tire out of the compartment from the holder 1. By exerting a further pull forwardly, the tire may be swung about the sill 15 and permitted to gravitate with the assistance of the attendant, out of the compartment.

The cover E for the compartment B is hinged at F so that the same may be swung to the open position shown in dotted lines in Figure 1 and is provided with any suitable locking means generally indicated at G for cooperation with the body portion H at the lower front end of the compartment whereby the cover E may be locked in closed position automatically as it is swung down, if desired.

The cover member E or door is preferably provided interiorly with cradles 16 in substantially circumferential alignment with the cradles 12 and similarly engageable with the tire at its upper and outer periphery as shown in Figure 1. The cradles 16 are likewise resilient and fixedly mounted as by welding or the like at 17 to the door E, reinforcing means such as the plates 18 being provided for the door. The cradles 16 are arranged on one side and the cradles 12 on the opposite side of a diametral line or plane of the tire when the same is mounted in the holder 1, so that all of said cradles cooperate with each other to prevent vibration of and properly hold the tire and wheel in position. When the door E is swung to the inoperative position shown in dotted lines in Figure 1, all of the luggage as well as the tire and wheel are rendered readily accessible. When the door E is in closed and locked position as shown in Figure 1, the tire and wheel as well as the luggage are rendered theft proof.

The tire D in the drawings is illustrated as mounted on a wheel rim, but this is done merely for convenience since obviously the tire could be mounted on an entire wheel, suitable provision for the hub of such wheel having been provided for at 3 in the holder 1.

It will be appreciated that the holder may be arranged at one end of the compartment, leaving the remainder of the compartment free for the reception of luggage. In the form of the invention shown in Figure 4, the luggage may be located on both sides of the holder 1.

The cradle elements 12 and 16 are preferably formed of resilient material such as sheet metal, although other materials found suitable for the purpose may be employed. The holder 1 is preferably formed of sheet metal and is preferably substantially rigid, although other materials may be employed therefor.

The trend of automobile body design nowadays is toward complete streamlining and, to this end, the rear body panel is made to slope downwardly as shown at A' in Figure 6, with a preferably central fin as at 19. Space is thus provided between the panel and the rear seat 20 for luggage and for a spare wheel and tire holder 21. The holder 21 may be constructed similar to the holder 1 of Figure 1, being secured at 22 to the floor 23 and secured and braced as at 24. The holder 21 may be provided with cradles as at 12 in Figure 1 or may itself be formed to engage the sides of the tread of the tire as at 25 in Figure 7. The holder 21 is preferably so arranged as to cause a major portion of the tire D to be disposed within the panel A', the remainder of the tire projecting rearwardly through the panel which is provided with an opening 26 for that purpose.

In the form of the invention shown in Figures 6, 7 and 8, the fin 19 is formed to simulate the projecting portion D' of the tire D and to completely enclose such projecting portion. The fin 19 is in this form of the invention hinged at 27 at its lower end to the panel A' and is provided with any suitable lock means shown diagrammatically at 28 arranged to cooperate with other means 29 provided in the panel A' and preferably key operated to release the fin 19.

The fin and cover member 19 is preferably provided with a cradle 30 constructed and arranged to cooperate with the exposed part D' of the tire D in substantially the same manner in which the cradles 16 of Figure 1 cooperate with the tire, so that the latter is resiliently held in position by the cradle 30 and holder 21 against rattling. To further this end, the cradle 30 is preferably arranged so as to be compressed against the tire D when the cover 19 is closed as shown in Figures 6 and 7.

Except for the opening 26 through which the tire D projects, the panel A' is preferably imperforate as shown in Figure 8, so that access to the luggage compartment provided between the panel A' and the seat indicated generally at 20 must be had from the inside of the automobile. To this end, the back 31 of the seat 20 is preferably made movable so as to be either removed bodily from the position shown or shifted to an upward position as shown at 31a, the space thus provided being of sufficient size to enable luggage to be passed therethrough either to be deposited in the luggage compartment or compartments or to be removed therefrom.

Thus it is clear that the member 19 functions as a tire cover as well as a stabilizer for a streamlined automobile. The member 19 may have an additional function. When the same is swung open and allowed to rest in open position as shown at 19a in dotted lines in Figure 6, the outer peripheral portion of the member 19 forms a runway down which and up which the tire may be supported and rolled as the tire is being deposited into or removed from the holder 21. The member 19 is designed to provide a temporary support for the tire and wheel when the member 19 is in its open position, the hinge 27 being preferably made sufficiently sturdy for the purpose.

To further carry out the streamlining, "pants" 32 may be provided to cooperate with the rear fenders 33 to shield the upper portions of the rear wheels and tires by which the automobile is supported. The pants 32 may be suitably secured to the fenders 33 by releasable means such as clips (not shown) or bolt means (not shown) so that the same may be removed when access to the rear wheels and associated structure is desired.

In the form of the invention appearing in Figures 9 and 10, the gasoline tank 34 is so located as to provide a holder or support for the spare tire D. To this end, the tank 34 is provided substantially centrally with a depression 35 of arcuate form to receive the lower arcuate portion of the tire D. To provide additional support and bracing for the tire D, there is provided a generally U-shaped element 36 which is preferably resilient and performs the function of a cradle as heretofore explained for engaging the sides of the tread of the tire D adjacent the seat back 31. So that the tire D may be held firmly in place, the stabilizing fin 37 is provided to cooperate with the otherwise exposed part D' of the tire D. The fin 37 is formed hollow and simulates generally the exposed portion of the tire D and is somewhat larger than that portion so as to enclose the same as shown in Figure 9. The member 37 thus serves also as a cover as well as a stabilizing member and is preferably hinged as at 38 to the panel A' so that said member 37 may be swung upwardly about the hinge 38 as a pivot to render the interior of the panel A' accessible for the deposit or removal of the tire D. If desired, the member 37 could be hinged at its lower end and function substantially the same as the member 19 of Figure 6. At the end opposite the hinge, the member 37 is provided with suitable lock means 39 preferably cooperating with other means in the panel A', a key being preferably used in connection with the means 39 for locking and releasing the member 37.

Ample space remains on each side of the tire D for luggage, and access to such spaces is preferably provided by means of covers 40 preferably hinged at their upper ends at 41 to the panel A' and provided with means 42 cooperating with the panel A' and preferably key-controlled as shown at 42 whereby the covers 40 or doors may be opened or closed and locked.

It will be appreciated that in the case of an automobile which has a rear engine drive, suitable provision may be made in the nose of the vehicle for the accommodation of the spare wheel in much the same manner in which provision is made in the case of a front drive automobile as herein illustrated and described.

By employing a construction along the lines of any of the forms referred to above, the source of air resistance heretofore existent due to projection of the entire spare wheel and tire on the outside of the body is eliminated.

It will be observed that the opening formed in the panel A' through which a portion of the spare tire D projects is bounded by an outwardly projecting flange 43 which is telescopically received by the marginal portion 44 of the stabilizing members 19 and 37 so as to prevent rain and other foreign matter from gaining access to the interior of the panel A' when said stabilizer members are in closed positions. Likewise, the panel A' at its openings 45 for the reception of luggage is flanged at 46 to be telescopically received within the corresponding flanges 47 of the cover members 40.

The stabilizer and cover member 37 is preferably provided with a transversely arranged and substantially centrally disposed and preferably resilient cradle 48 which may be secured and serve to operate in substantially the same way in which the cradle 30 of Figure 7 is secured and operates.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

In combination with an automobile luggage compartment, spare tire holding means comprising the automobile fuel tank formed with a depression and associated with said compartment for receiving and supporting the tire, and cover means associated with the compartment for covering the tire and provided with resilient transverse tire cradling means cooperating with the aforesaid means for preventing rattling of the tire.

GEORGE ALBERT LYON.